US012303453B2

(12) United States Patent
Etheridge et al.

(10) Patent No.: US 12,303,453 B2
(45) Date of Patent: May 20, 2025

(54) LEGGED MOBILITY EXOSKELETON DEVICE WITH ENHANCED ADJUSTMENT MECHANISMS

(71) Applicant: Ekso Bionics Holdings, Inc., San Rafael, CA (US)

(72) Inventors: Steven Jefferson-Shawn Etheridge, Tallmadge, OH (US); Mike Clausen, Turlock, CA (US); Ryan Farris, Solon, OH (US)

(73) Assignee: EKSO BIONICS HOLDINGS, INC., San Rafael, CA (US)

( * ) Notice: Subject to any disclaimer, the term of this patent is extended or adjusted under 35 U.S.C. 154(b) by 952 days.

(21) Appl. No.: 17/400,644

(22) Filed: Aug. 12, 2021

(65) Prior Publication Data

US 2021/0369544 A1 Dec. 2, 2021

Related U.S. Application Data

(62) Division of application No. 16/335,902, filed as application No. PCT/US2017/064120 on Dec. 1, 2017, now Pat. No. 11,123,255.

(Continued)

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0244* (2013.01);
(Continued)

(58) Field of Classification Search
CPC . A61H 3/00; A61H 3/008; A61H 3/02; A61H 2003/007; A61H 1/024;
(Continued)

(56) References Cited

U.S. PATENT DOCUMENTS 8,418,704 B1 * 4/2013 Teeters .................... A61H 3/02 135/69
2010/0121233 A1 5/2010 Ashihara et al.
(Continued)

FOREIGN PATENT DOCUMENTS

CN 201759829 U 3/2011
CN 105167963 A 12/2015
(Continued)

OTHER PUBLICATIONS

English Machine Translation of DE-102014201275-A1 provided by PE2E (Year: 2014).*
(Continued)

*Primary Examiner* — Joseph D. Boecker
*Assistant Examiner* — Brian T Khong
(74) *Attorney, Agent, or Firm* — Renner, Otto, Boisselle & Sklar, LLP

(57) ABSTRACT

A leg component includes a central carrier, and first and second housings that are located on opposite sides of the central carrier. An adjustment mechanism including a drive shaft that drives driven shafts, such as by a worm/worm gear interaction, implements movement of the first housing to relative to the second housing to adjust a length of the leg component.

11 Claims, 13 Drawing Sheets

Related U.S. Application Data

(60) Provisional application No. 62/445,314, filed on Jan. 12, 2017.

(52) U.S. Cl.
CPC .................. *A61H 2003/007* (2013.01); *A61H 2201/0192* (2013.01); *A61H 2201/1215* (2013.01); *A61H 2201/123* (2013.01); *A61H 2201/1628* (2013.01); *A61H 2201/163* (2013.01); *A61H 2201/165* (2013.01); *A61H 2201/1676* (2013.01); *A61H 2205/088* (2013.01)

(58) Field of Classification Search
CPC .. A61H 1/0244; A61H 1/0237; A61H 1/0255; A61H 1/0262; A61H 2201/0192
See application file for complete search history.

(56) References Cited

U.S. PATENT DOCUMENTS

| | | | | |
|---|---|---|---|---|
| 2011/0270146 | A1 | 11/2011 | Chang et al. | |
| 2014/0259798 | A1 | 9/2014 | Hollander | |
| 2016/0270997 | A1 * | 9/2016 | Little .................. | A61H 1/0266 |

FOREIGN PATENT DOCUMENTS

| | | | | |
|---|---|---|---|---|
| CN | 106142056 | A | 11/2016 | |
| DE | 102014201275 | A1 * | 7/2014 | ........... A01G 23/083 |
| EP | 1159940 | A2 | 12/2001 | |
| JP | H07246223 | A | 9/1995 | |
| JP | 2011156344 | A | 8/2011 | |
| WO | 2011123951 | A1 | 10/2011 | |
| WO | WO-2013136351 | A2 * | 9/2013 | ............. A61H 3/008 |
| WO | 2015080596 | A1 | 6/2015 | |
| WO | 2016128877 | A1 | 8/2016 | |

OTHER PUBLICATIONS

International Search Report of PCT/US2017/064120 dated Jun. 20, 2018.

* cited by examiner

LEGGED MOBILITY EXOSKELETON DEVICE WITH ENHANCED ADJUSTMENT MECHANISMS

RELATED APPLICATIONS

This application is a divisional application of U.S. application Ser. No. 16/335,902 filed on Mar. 22, 2019, which is a national stage application pursuant to 35 U.S.C. § 371 of PCT/US2017/064120 filed on Dec. 1, 2017, which claims the benefit of U.S. Provisional Application No. 62/445,314 filed Jan. 12, 2017, the contents of which are incorporated herein by reference.

FIELD OF INVENTION

The present invention relates to movement assist devices, such as a legged mobility device or "exoskeleton" device, and more particularly mechanisms for adjusting or otherwise adapting such devices to better conform to and fit the body of a particular user.

BACKGROUND OF THE INVENTION

There are currently on the order of several hundred thousand spinal cord injured (SCI) individuals in the United States, with roughly 12,000 new injuries sustained each year at an average age of injury of 40.2 years. Of these, approximately 44% (approximately 5300 cases per year) result in paraplegia. One of the most significant impairments resulting from paraplegia is the loss of mobility, particularly given the relatively young age at which such injuries occur. Surveys of users with paraplegia indicate that mobility concerns are among the most prevalent, and that chief among mobility desires is the ability to walk and stand. In addition to impaired mobility, the inability to stand and walk entails severe physiological effects, including muscular atrophy, loss of bone mineral content, frequent skin breakdown problems, increased incidence of urinary tract infection, muscle spasticity, impaired lymphatic and vascular circulation, impaired digestive operation, and reduced respiratory and cardiovascular capacities.

In an effort to restore some degree of legged mobility to individuals with paraplegia, several lower limb orthoses have been developed. The simplest form of such devices is passive orthotics with long-leg braces that incorporate a pair of ankle-foot orthoses (AFOs) to provide support at the ankles, which are coupled with leg braces that lock the knee joints in full extension. The hips are typically stabilized by the tension in the ligaments and musculature on the anterior aspect of the pelvis. Since almost all energy for movement is provided by the upper body, these passive orthoses require considerable upper body strength and a high level of physical exertion, and provide very slow walking speeds.

The hip guidance orthosis (HGO), which is a variation on long-leg braces, incorporates hip joints that rigidly resist hip adduction and abduction, and rigid shoe plates that provide increased center of gravity elevation at toe-off, thus enabling a greater degree of forward progression per stride. Another variation on the long-leg orthosis, the reciprocating gait orthosis (RGO), incorporates a kinematic constraint that links hip flexion of one leg with hip extension of the other, typically by means of a push-pull cable assembly. As with other passive orthoses, the user leans forward against a stability aid (e.g., bracing crutches or a walker) while un-weighting the swing leg and utilizing gravity to provide hip extension of the stance leg. Since motion of the hip joints is reciprocally coupled through the reciprocating mechanism, the gravity-induced hip extension also provides contralateral hip flexion (of the swing leg), such that the stride length of gait is increased. One variation on the RGO incorporates a hydraulic-circuit-based variable coupling between the left and right hip joints. Experiments with this variation indicate improved hip kinematics with the modulated hydraulic coupling.

To decrease the high level of exertion associated with passive orthoses, the use of powered orthoses has been under development, which incorporate actuators and drive motors associated with a power supply to assist with locomotion. These powered orthoses have been shown to increase gait speed and decrease compensatory motions, relative to walking without powered assistance. The use of powered orthoses presents an opportunity for electronic control of the orthoses, for enhanced user mobility.

An example of the current state of the art of exoskeleton devices is shown in Applicant's co-pending International Application Serial No. PCT/US2015/23624, entitled "Wearable Robotic Device," filed 31 Mar. 2015. Such device was designed in a "three sizes fits most" configuration including three major modular component types of a hip component, upper leg or thigh components, and lower leg components. By mixing and matching different sizes of the modular components, exoskeleton devices sized as most appropriate for any given user is achieved.

SUMMARY OF THE INVENTION

The present invention is directed to movement assist devices such as powered limb or gait orthoses or wearable robotic legged mobility devices or "exoskeletons," and more particularly to enhanced mechanisms for adjusting or otherwise adapting such devices to better conform to or fit the body of a particular user. The present invention provides for a legged mobility device incorporating enhanced adjust mechanisms, particularly for the main components including a hip component and upper and/or lower leg components. The enhanced adjustability mechanisms result in easy adjustability that can be performed by a clinician or support person, or by a device user with physical impairments typical of users of such devices. Simultaneous adjustability of both width and depth of the hip component is achieved, with an increased control over a degree of abduction and/or adduction of the leg components in a legged mobility device. Features further include an adjustment mechanism particularly suitable for adjusting length of upper and/or lower leg components of a legged mobility device. The present invention thus results in an improved fit to the user, and the convenience of one device which can fit a wide range of patients in a clinical use setting.

An aspect of the invention is a hip component for a legged mobility device having an enhanced adjustment mechanism for simultaneous adjustment of both a width and depth of the hip component. In exemplary embodiments, the hip component may include a hip body, and a hip insert assembly attached to the hip body for adjusting a size of the hip component. The hip insert assembly may include a carrier assembly mounted to the hip body, and a main insert assembly spaced apart from the carrier assembly. One or more adjustment screws are connected at a first end to the carrier assembly, and are connected at a second end opposite from the first end to the main insert assembly. The carrier assembly includes an adjustment mechanism to effect translational movement of the adjustment screws to move the main insert assembly either closer to or farther from the carrier assembly to adjust the size of the hip component.

The carrier assembly may include a drive shaft that is rotatable to move an adjustment element to drive the translational movement of the one or more adjustment screws to adjust the size of the hip component. The adjustment mechanism may include one or more sprockets corresponding to the one or more adjustment screws, the one or more sprockets having internal threads that interface with corresponding external threading of the one or more adjustment screws. The moveable adjustment element may be configured as a rotatable adjustment chain that loops around the sprockets. Rotation of the drive shaft drives rotation of the adjustment chain, which in turn drives rotation of the sprockets, and the interfacing of the internal threads of the sprockets with the external threading of the adjustment screws causes the translational movement of the adjustment screws.

In other exemplary embodiments, the hip component may include an enhanced abduction/adduction control mechanism. In such embodiments the main insert assembly of the hip insert assembly may include a hip insert having a receiving portion and an inner insert that is inserted into the receiving portion of the hip insert, wherein the inner insert is rotatable relative to the hip insert in abduction and adduction directions relative to a centerline axis of the hip body. The main insert assembly further may include an abduction/adduction control mechanism for controlling a degree of the abduction and adduction movement of the inner insert relative to the hip insert. The abduction/adduction control mechanism may comprise elastomeric bushings that are configured to control the degree of the abduction and adduction movement of the inner insert relative to the hip insert. The elastomeric bushings may be made of a durometer of urethane, and the elastomeric bushings are selectable from among a plurality of durometers of urethane and the selected durometer of urethane sets the level of resistance to compression, and thereby a degree of potential abduction and adduction. The elastomeric bushings also are selectable from among a plurality of shapes, and a selected shape the elastomeric bushings presets the initial angle of rotation of the inner insert.

Another aspect of the invention is a leg component for a legged mobility device having an enhanced adjustment mechanism for adjusting a length of the leg component. In exemplary embodiments, the leg component may include a central carrier, and first and second housings that are located on opposite sides of the central carrier and mechanically connected to the central carrier. An adjustment mechanism is configured to effect movement of the first housing either closer to or farther from the second housing to adjust a length of the leg component. The adjustment mechanism may include a drive shaft that extends through the central carrier, and one or more driven shafts that extend through the central carrier and are connected at a first end to the first housing and connected at a second end opposite from the first end to the second housing. The drive shaft rotates to drive the one or more driven shafts, such as by employing a worm/worm gear interaction, to effect translational movement of the one or more driven shafts to move the first housing closer to or farther from the second housing to adjust the length of the leg component.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
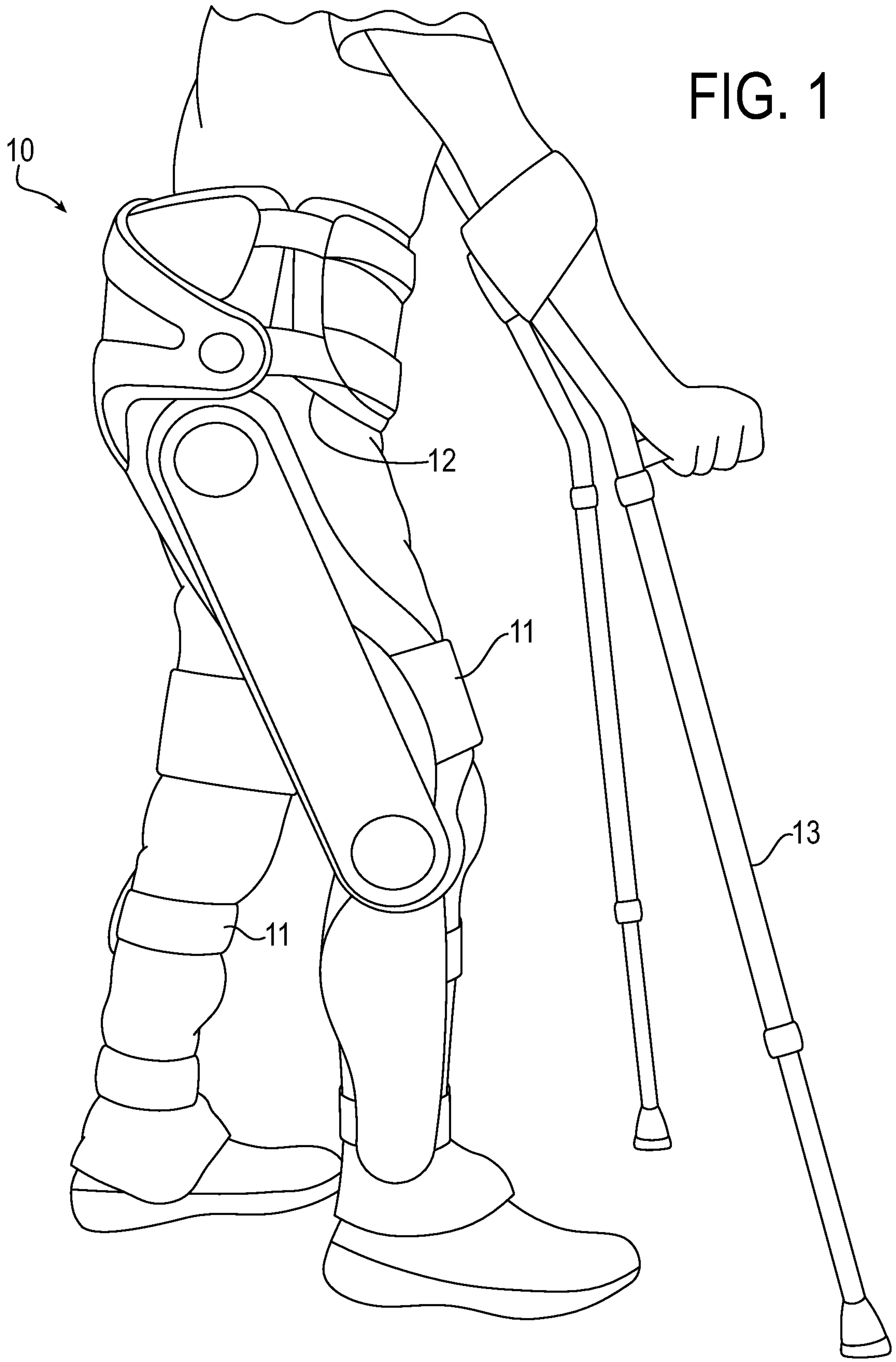
FIG. 1 is a drawing depicting an exemplary exoskeleton device as being worn by a user.

Embodiments of the present invention will now be described with reference to the drawings, wherein like reference numerals are used to refer to like elements throughout. It will be understood that the figures are not necessarily to scale.

For context, FIGS. 1-6 depict various views of an exemplary exoskeleton device that may be used in connection with the adjustment mechanisms of the present invention. A somewhat generalized description of such exoskeleton device is provided here for illustration purposes. A more detailed description of such device may be found in Applicant's International Patent Appl. No. PCT/US2015/023624 filed on Mar. 3, 2015, which is incorporated here in its entirety by reference. It will be appreciated, however, that the described exoskeleton device presents an example usage, and that the features of the adjustment mechanism of the present invention are not limited to any particular configuration of an exoskeleton device. Variations may be made to the exoskeleton device, while the features of the present invention remain applicable. In addition, the principles of this invention may be applied generally to any suitable mobility device. Such mobility devices include, for example, orthotic devices which aid in mobility for persons without use or limited use of a certain body portion, and prosthetic devices, which essentially provide an electromechanical replacement of a body part that is not present such as may be used by an amputee or a person congenitally missing a body portion.

As show in FIG. 1, an exoskeleton device 10, which also may be referred to in the art as a "wearable robotic device", can be worn by a user. To attach the device to the user, the device 10 can include attachment devices 11 for attachment of the device to the user via belts, loops, straps, or the like. Furthermore, for comfort of the user, the device 10 can include padding 12 disposed along any surface likely to come into contact with the user. The device 10 can be used with a stability aid 13, such as crutches, a walker, or the like.

Figure 2:
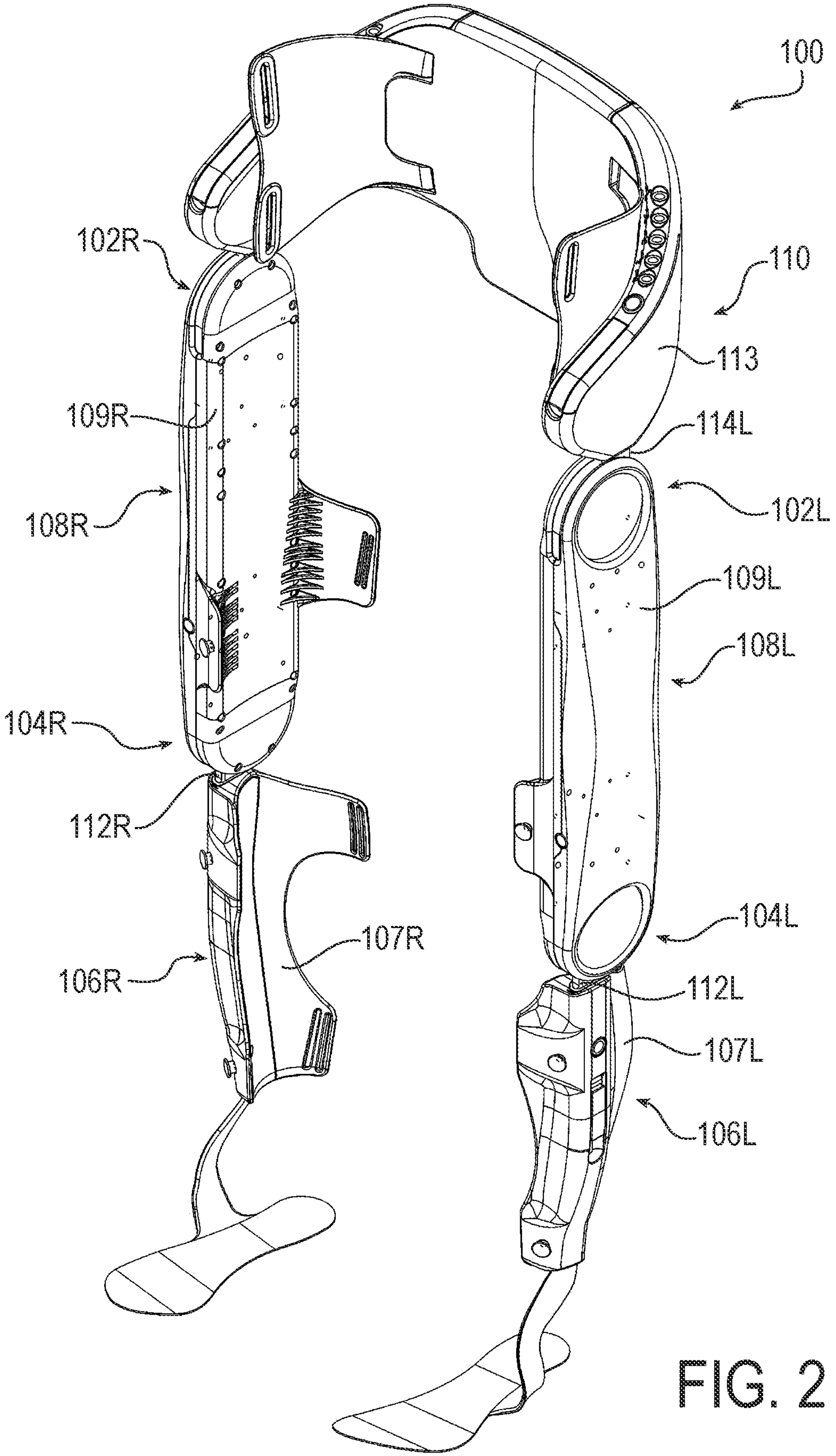
FIG. 2 is a drawing depicting a perspective view of an exemplary exoskeleton device in a standing position.
Figure 3:
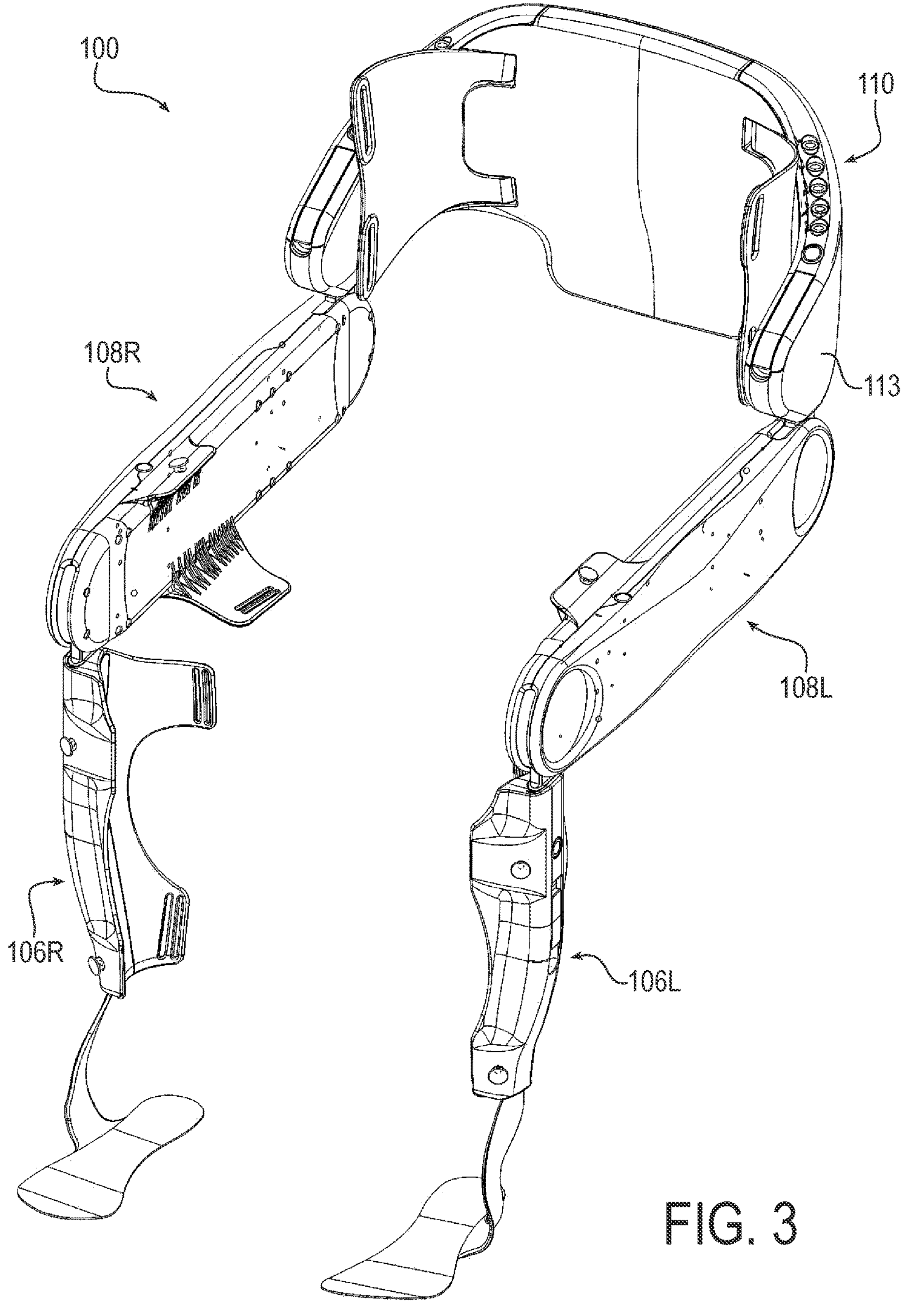
FIG. 3 is a drawing depicting a perspective view of the exemplary exoskeleton device in a seated position.
Figure 4:
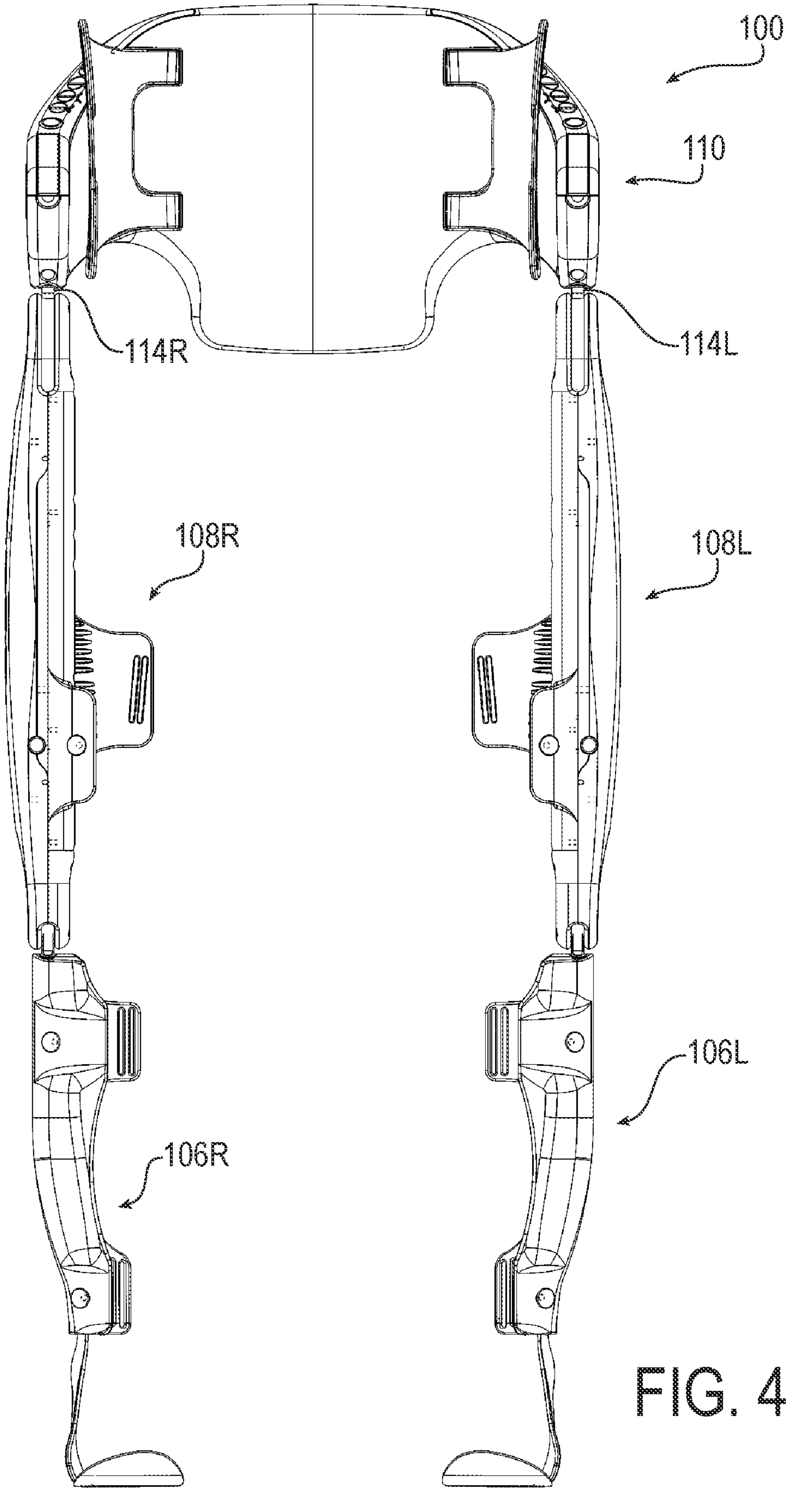
FIG. 4 is a drawing depicting a front view of the exemplary exoskeleton device in a standing position.
Figure 5:
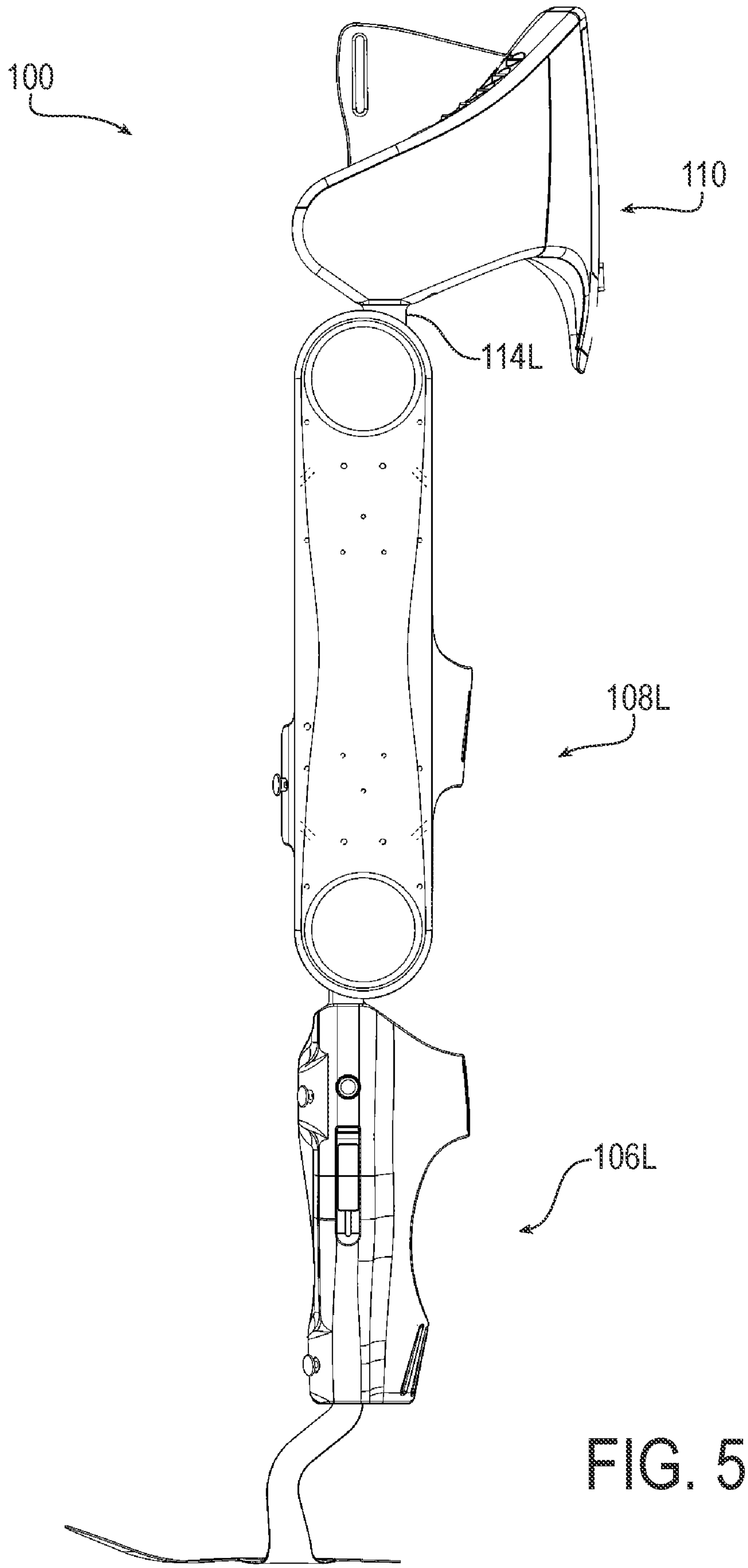
FIG. 5 is a drawing depicting a side view of the exemplary exoskeleton device in a standing position.
Figure 6:
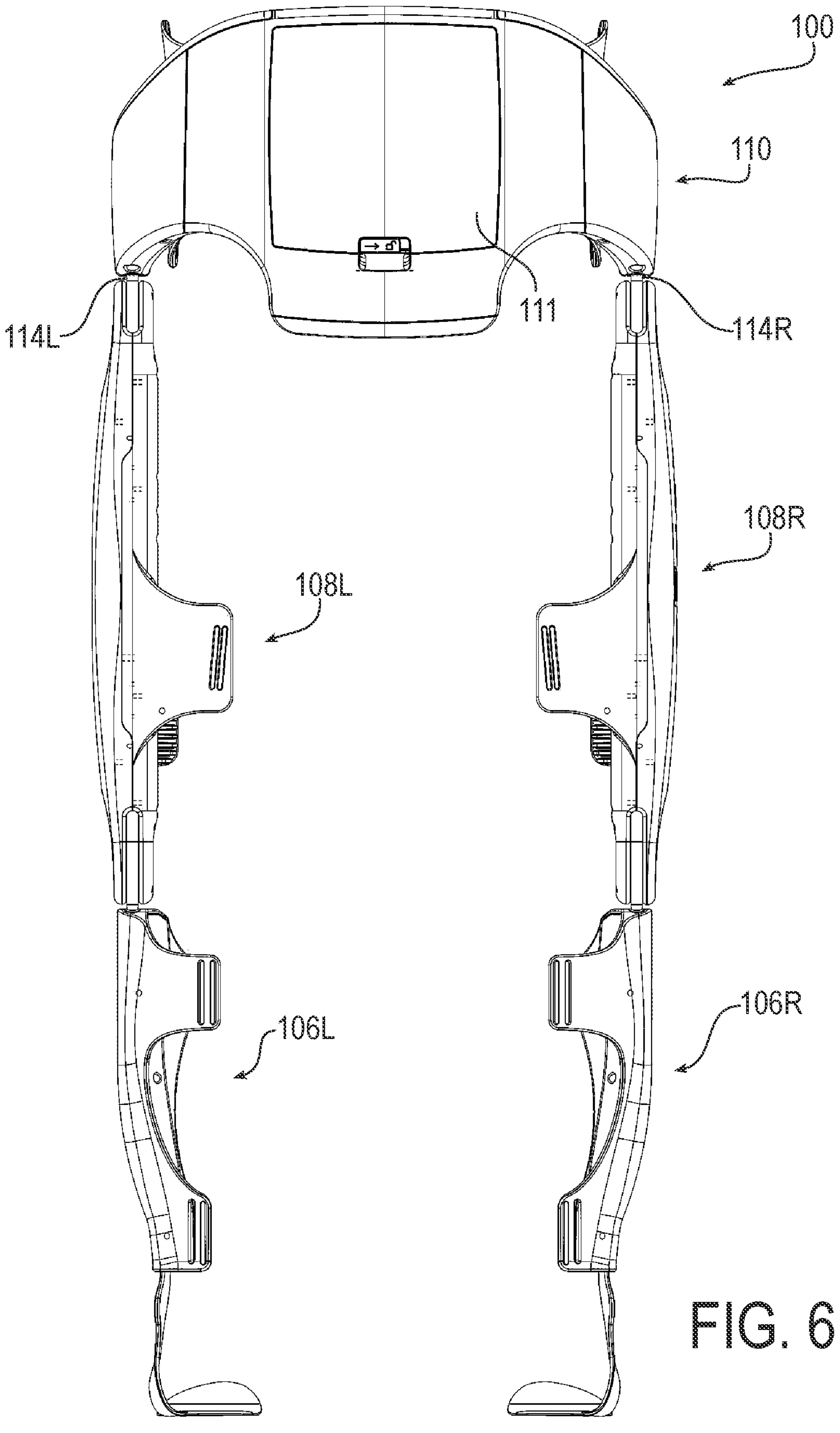
FIG. 6 is a drawing depicting a back view of the exemplary exoskeleton device in a standing position.

An exemplary legged mobility exoskeleton device is illustrated as a powered lower limb orthosis 100 in FIGS. 2-6. Specifically, the orthosis 100 shown in FIGS. 2-6 may incorporate four drive components configured as electromotive devices (for example, electric motors), which impose sagittal plane torques at each knee and hip joint components including (right and left) hip joint components 102R, 102L and knee joint components 104R, 104L. FIG. 2 shows the orthosis 100 in a standing position while FIG. 3 shows the orthosis 100 in a seated position.

As seen in the figures, the orthosis contains five assemblies or modules, although one or more of these modules may be omitted and further modules may be added (for example, arm modules), which are: two lower (right and left) leg assemblies (modules) 106R and 106L, two (left and right) thigh assemblies 108R and 108L, and one hip assembly 110. Each thigh assembly 108R and 108L includes a respective thigh assembly housing 109R and 109L, and link, connector, or coupler 112R and 112L extending from each of the knee joints 104R and 104L and configured for moving in accordance with the operation of the knee joints 104R and 104L to provide sagittal plane torque at the knee joints 104R and 104L.

The connectors 112R and 112L further may be configured for releasably mechanically coupling each of thigh assembly 108R and 108L to respective ones of the lower leg assemblies 106R and 106L. Furthermore, each thigh assembly 108R and 108L also includes a link, connector, or coupler 114R and 114L, respectively, extending from each of the hip joint components 102R and 102L and moving in accordance with the operation of the hip joint components 102R and 102L to provide sagittal plane torque at the knee joint components 104R and 104L. The connectors 114R and 114L further may be configured for releasably mechanically coupling each of thigh assemblies 108R and 108L to the hip assembly 110.

In accordance with the principles of the present invention, the various components of device 100 can be dimensioned for the user using the enhanced adjustment mechanisms described below. In this manner, the individual components can be configured to accommodate a variety of users, and then mixed and matched as appropriate to expand versatility for accommodating different body sizes. For example, the two thigh assemblies 108R and 108L, and one hip assembly 110 can be adjustable. That is, thigh assembly housings 109R, 109L, the lower leg assembly housings 107R and 107L for the lower leg assemblies 106R, 106L, respectively, and the hip assembly housing 113 for the hip assembly 110 can be configured to allow the user or medical professional to adjust the length of these components in the field using the adjustment mechanisms of the present invention. In view of the foregoing, the two lower leg assemblies 106R and 106L, two thigh assemblies 108R and 108L, and one hip assembly 110 can form a modular system allowing for one or more of the components of the orthosis 100 to be selectively replaced and for allowing an orthosis to be created for a user without requiring customized components. Such modularity can also greatly facilitate the procedure for donning and doffing the device.

In orthosis 100, each thigh assembly housing 109R, 109L may include substantially all the drive components for operating and driving corresponding ones of the knee joint components 104R, 104L and the hip joint components 102R, 102L.

In particular, each of thigh assembly housings 109R, 109L may include drive components configured as two motive devices (e.g., electric motors) which are used to drive the hip and knee joint component articulations. However, the various embodiments are not limited in this regard, and some drive components can be located in the hip assembly 110 and/or the lower leg assemblies 106R, 106L.

A battery 111 for providing power to the orthosis can be located within hip assembly housing 113 and connectors 114R and 114L can also provide means for connecting the battery 111 to any drive components within either of thigh assemblies 108R and 108L. For example, the connectors 114R and 114L can include wires, contacts, or any other types of electrical elements for electrically connecting battery 111 to electrically powered components in thigh assemblies 108R and 108L. In the various embodiments, the placement of battery 111 is not limited to being within hip assembly housing 113. Rather, the battery can be one or more batteries located within any of the assemblies of orthosis 100.

The referenced drive components may incorporate suitable sensors and related internal electronic controller or control devices for use in control of the exoskeleton device. Such internal control devices may perform using the sensory information the detection of postural cues, by which the internal control device will automatically cause the exoskeleton device to enter generalized modes of operation, such as sitting, standing, walking, variable assist operation, and transitions between these generalized modes or states (e.g., Sit to Stand, Stand to Walk, Walk to Stand, Stand to Sit, etc.) and step transition (e.g., Right Step, Left Step).

The present invention particularly is directed to enhanced adjustment mechanisms for the main components of a legged mobility or exoskeleton device, including a hip component and upper and/or lower leg components. The enhanced adjustability mechanisms result in easy adjustability that can be performed by an individual device user who has physical impairments common among users of such devices, or by a clinician or a support person. Simultaneous adjustability of both width and depth of the hip component is achieved, with an increased control over a degree of abduction and/or adduction of the leg components in a legged mobility device. Features further include an adjustment mechanism particularly suitable for adjusting length of upper and/or lower leg components of a legged mobility device.

Figure 7:
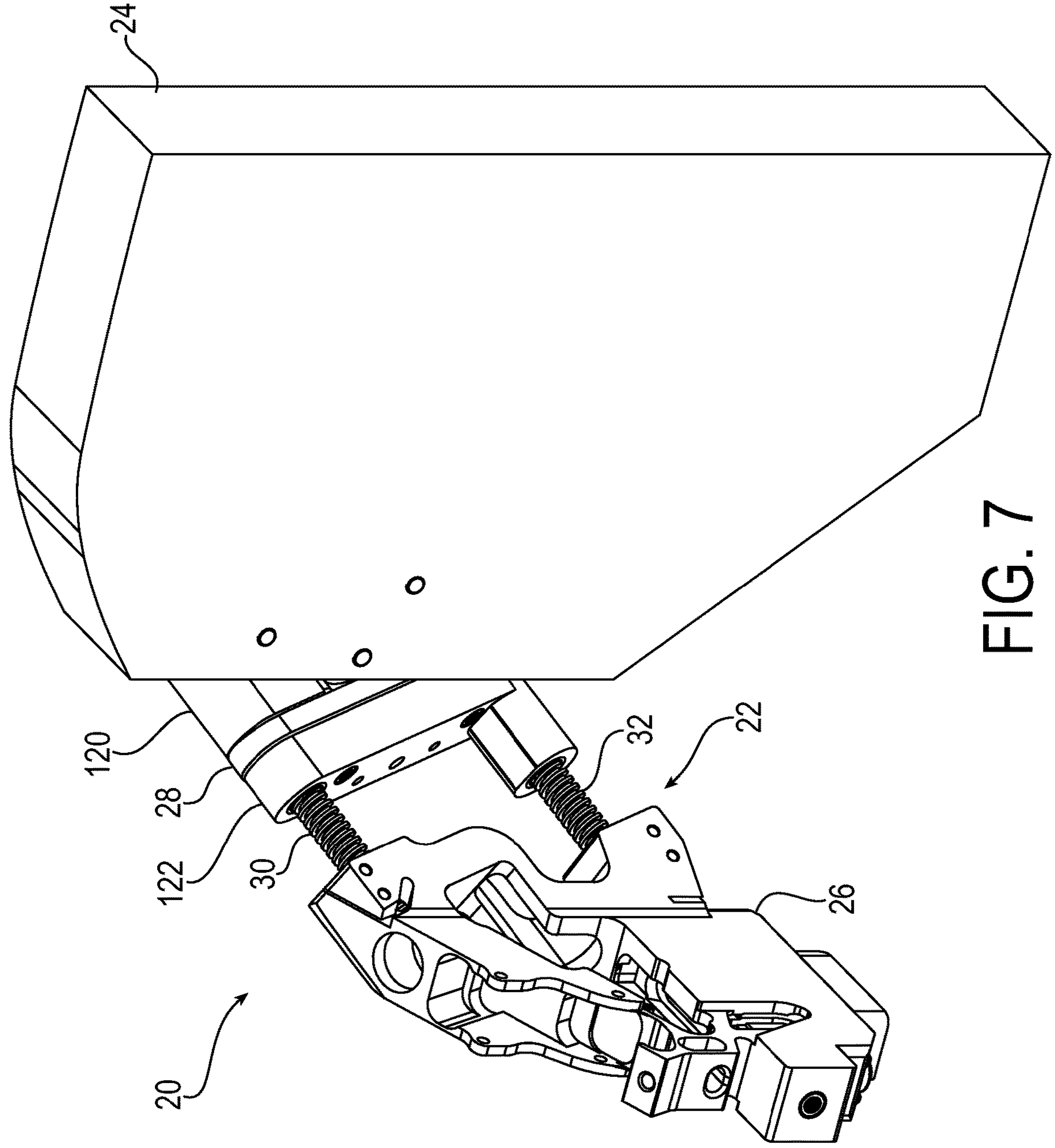
FIG. 7 is a drawing depicting an isometric view of a portion of an exemplary hip component of an exoskeleton device, in accordance with embodiments of the present invention.
Figure 8:
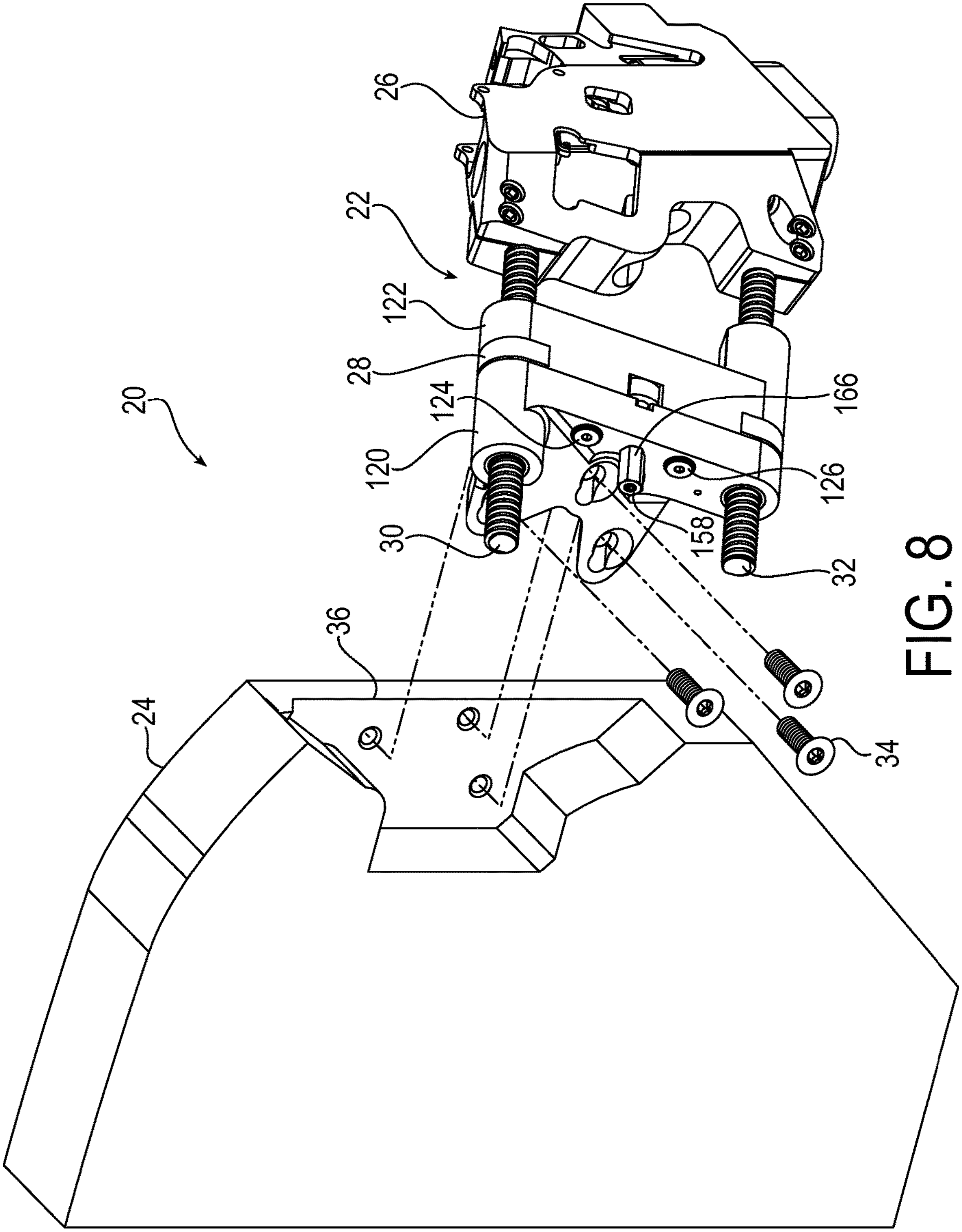
FIG. 8 is a drawing depicting a partially exploded view of the exemplary hip component portion of FIG. 7.

FIG. 7 is a drawing depicting an isometric view of a portion of an exemplary hip component 20 of an exoskeleton device in accordance with embodiments of the present invention. FIG. 8 is a drawing depicting a partially exploded view of the exemplary hip component 20 of FIG. 7. FIGS. 7 and 8 actually depict portions of the hip component respectively corresponding to the right and left sides for ease of illustration, as comparable and symmetrical configurations are used on both the left and right sides. The hip component portions of FIGS. 7 and 8 may be employed in the hip component of the exoskeleton device depicted in FIGS. 1-6.

The hip component 20 may include a hip insert assembly 22 that is attached to a hip body 24. The hip body 24 may include for example, battery, drive, control, and sensor components encompassed within a housing. The hip insert assembly 22 constitutes an enhanced adjustment mechanism for adjusting the size of the hip component in accordance with embodiments of the present invention. The hip insert assembly 22 may include a main insert assembly 26 and a carrier assembly 28. The main insert assembly 26 and the carrier assembly 28 may be connected to each other by one or more adjustment screws. Two adjustment screws 30 and 32 are present in the exemplary embodiment of FIGS. 7 and 8. As further detailed below, adjustability is achieved by movement of the main insert assembly relative to the carrier assembly along the adjustment screws. By such movement, simultaneous adjustment of both the width and depth of the hip component 20 is achieved.

Referring to FIG. 8, the hip insert assembly 22 may be connected to the hip body 24 using a plurality of fastening elements 34. The fastening elements 34 may be any suitable fastening structures (e.g., bolts, screws, pins, or similar). The fastening elements 34 extend through receiving holes in the carrier assembly 28, which are then fixed in receiving holes in a mounting plate portion 36 of the hip body 24.

In exemplary embodiments, the hip component has enhanced features for controlling a degree of abduction and adduction relative to a centerline axis of the hip body. When donned by a user, the centerline axis of the hip body essentially would correspond to a centerline axis of the user. As understood by those of ordinary skill in the art, abduction refers to a pivoting movement away from such centerline axis, and adduction refers to a pivoting movement toward such centerline axis.

Generally, in exemplary embodiments, a hip component for a legged mobility device may include a hip body, and a hip insert assembly attached to the hip body. The hip insert may include a carrier assembly mounted to the hip body, and a main insert assembly that is spaced apart from the carrier assembly, the main insert assembly being connected to the carrier assembly via a fastening element (e.g., the one or more adjustment screws). The main insert assembly may include a hip insert having a receiving portion and an inner insert that is inserted into the receiving portion of the hip insert, wherein the inner insert is rotatable relative to the hip insert in abduction and adduction directions relative to a centerline axis of the hip body.

The main insert assembly further may include an abduction/adduction control mechanism for controlling a degree of the abduction and adduction movement of the inner insert relative to the hip insert.

Figure 10:
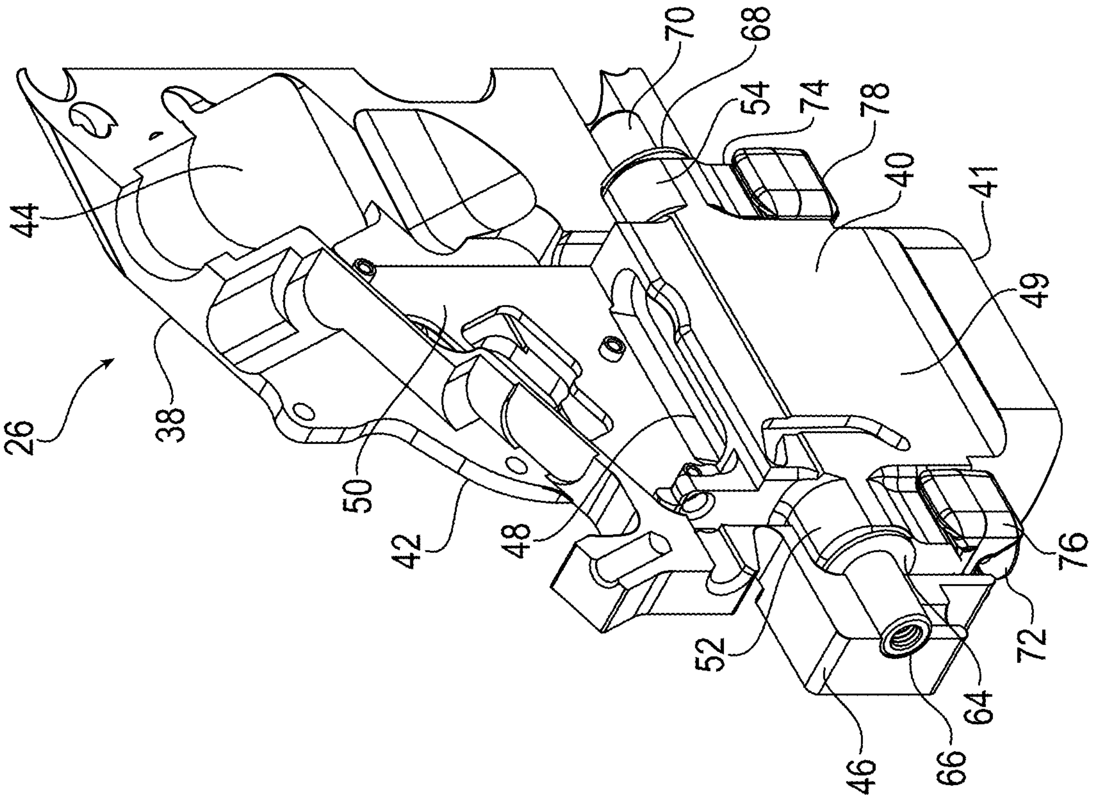
FIG. 10 is a drawing depicting an isometric cross-sectional view of the main insert assembly of FIG. 9, cut along approximately mid plane of the main insert assembly.
Figure 9:
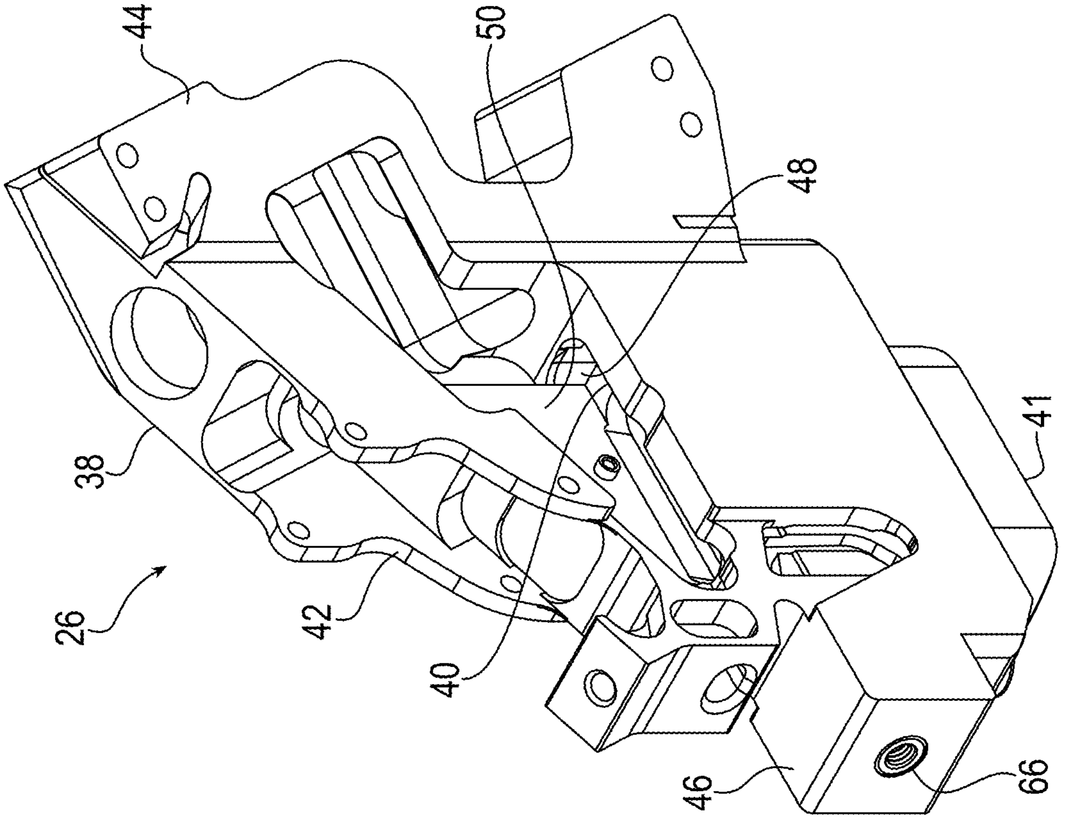
FIG. 9 is a drawing depicting an isometric view of an exemplary main insert assembly for use in the hip component of FIGS. 7-8, in accordance with embodiments of the present invention.
Figure 11:
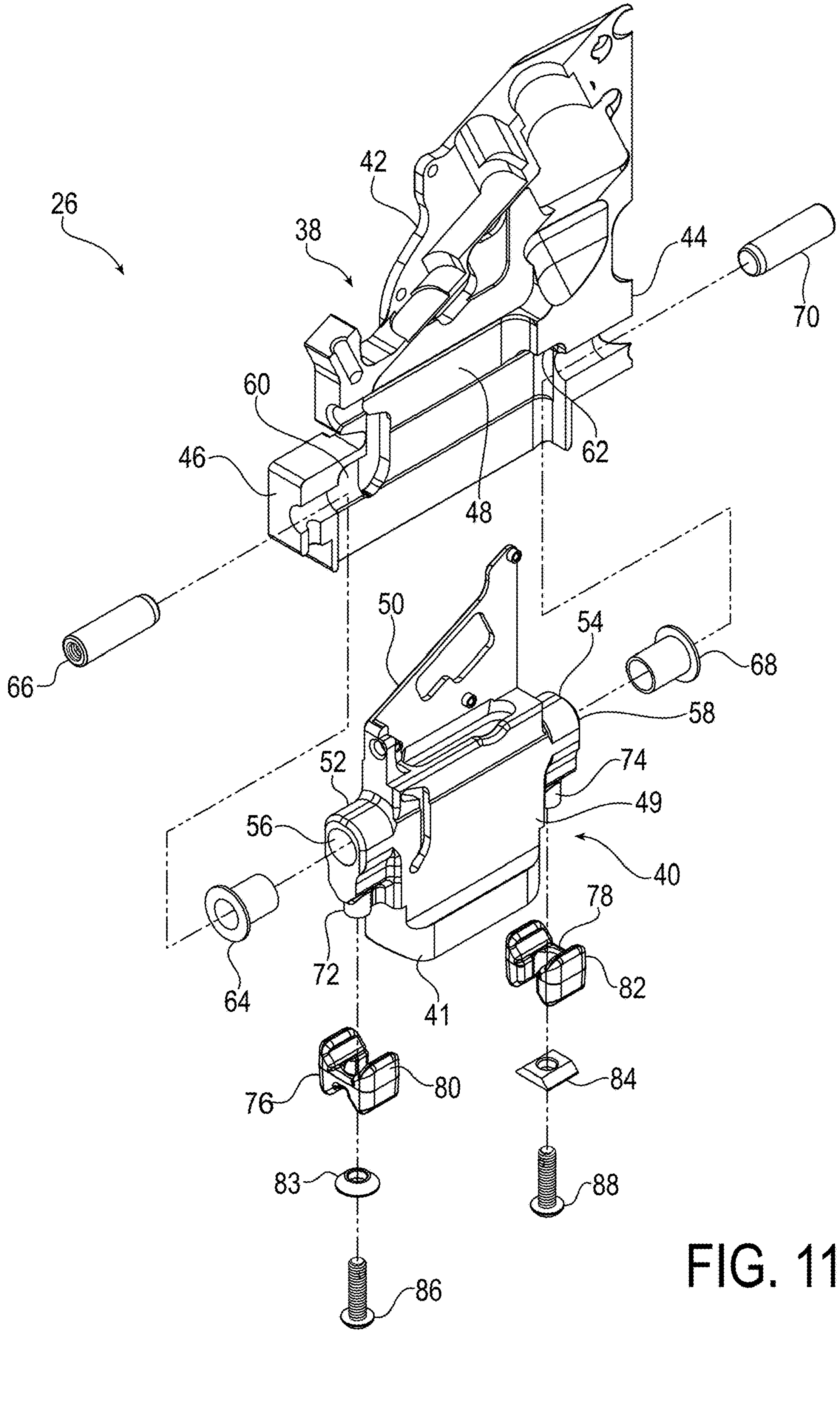
FIG. 11 is a drawing depicting an exploded view of the exemplary main insert assembly of FIGS. 9 and 10.

FIG. 9 is a drawing depicting an isometric view of an exemplary main insert assembly 26 for use in the hip component of FIGS. 7-8 in accordance with embodiments of the present invention. FIG. 10 is a drawing depicting an isometric cross-sectional view of the main insert assembly 26 of FIG. 9, cut along approximately mid plane of the main insert assembly. FIG. 11 is a drawing depicting an exploded view of the exemplary main insert assembly 26 of FIGS. 9 and 10.

The main insert assembly 26 may include a hip insert 38 that is configured to receive an inner insert 40. As most readily seen in the exploded view of FIG. 11, the hip insert 38 may include a main frame 42, from which there extends an adjusting portion 44 into which the adjustment screws 30 and 32 are received as shown in previous figures. The hip insert 38 further may include a receiving portion 46 that extends from the main frame 42 at generally a right angle relative to the adjusting portion 44. The receiving portion 46 includes a recess 48 for receiving the inner insert 40, as further explained below. In this manner, the hip insert 38 (including the main insert 42, adjusting portion 44, and receiving portion 46) has a generally "L-shaped" configuration. This permits the overall main insert assembly 26 to be attached to both the carrier assembly 28 and a thigh component of the exoskeleton device.

The inner insert 40 may include a central body 49 and a flange 50 that extends from the central body upward into the hip insert 38. As shown in FIGS. 9-11, the flange 50 extends through the recess 48 and lies against an oppositely shaped portion of the main frame 42. In this manner, the inner insert 40 may be inserted into the hip insert 38. The inner insert 40 further may include a connector 41 that extends from the central body 49 oppositely from the flange 50. The connector 41 is used to connect the overall hip component 20 (via the main insert assembly) to a thigh component of an exoskeleton device.

The inner insert 40 further may include opposite first and second pin receivers 52 and 54 (seen best in FIGS. 10 and 11) that respectively define first and second pin holes 56 and 58. The pin receivers 52 and 54 extend laterally from opposing sides of the central body 49 of the inner insert 40, and when the inner insert 40 is inserted into the hip insert 38, the pin receivers 52 and 54 rest in corresponding first and second bores 60 and 62 (exploded view of FIG. 11) defined by the receiving portion 46 of the hip insert 38. The pin receivers respectively may receive first and second pins. In particular, the first pin receiver 52 may receive a first pin bushing 64 that is received within the first pin hole 56, and a first pin 66 is received within the first pin bushing 64. Comparably, the second pin receiver 54 may receive a second pin bushing 68 that is received within the second pin hole 56, and a second pin 70 is received within the second pin bushing 68. As further detailed below, the inner insert is rotatable about the pins in the abduction and adduction directions. With such rotation, the pin bushings provide riding surfaces for rotation of the inner insert about the first and second pins. Accordingly, when a thigh component of an exoskeleton or legged mobility device is connected to the hip component via the connector 41, inner insert 40 (with the connected thigh component) can rotate a desired amount about the pins 66 and 70 to permit abduction and adduction of the thigh component.

The first and second pin receivers 52 and 54 of the inner insert 40 further respectively may include first and second pegs 72 and 74, which extend in a direction away from the hip insert 38, i.e., toward the connector 41 and away from the flange 50. The abduction/adduction control mechanism may include first and second elastomeric bushings that respectively extend around the first and second pegs, and the first and second elastomeric bushings are configured to control the degree of the abduction and adduction movement of the inner insert relative to the hip insert. As seen in the example of FIGS. 9-11, the pegs 72 and 74 respectively may receive first and second elastomeric bushings 76 and 78, which extend around the pegs 72 and 74. Suitable examples of the material of the elastomeric bushings include varying durometers of urethane, and particularly the specific durometer of urethane can be varied for different users. The elastomeric bushings may include shaped ridges 80 and 82 (see FIG. 11), which also can be varied in size and shape for different users. The elastomeric bushings are held in place around the pegs using wedge nuts 83 and 84, and fasteners 86 and 88 (e.g., screws, bolts, or the like).

Figure 12A:
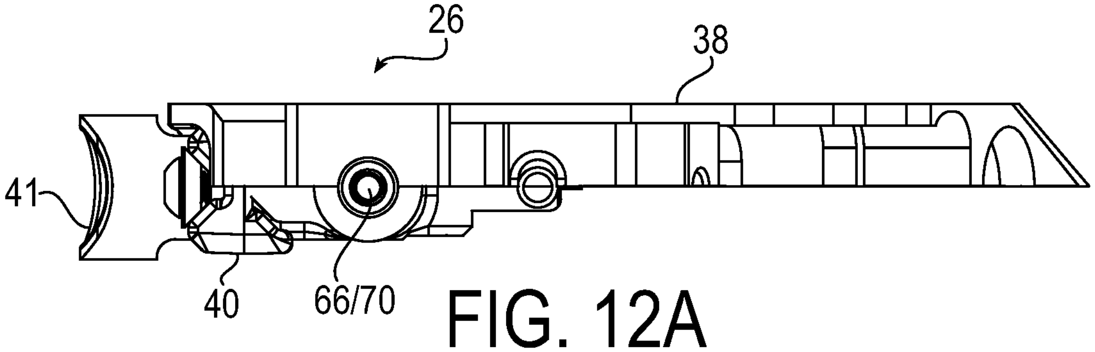
FIGS. 12A, 12B, and 12C are drawings depicting top cross-sectional views of the exemplary main insert assembly of FIGS. 9-11, showing different positional states corresponding to different degrees of abduction and adduction.
Figure 12B:
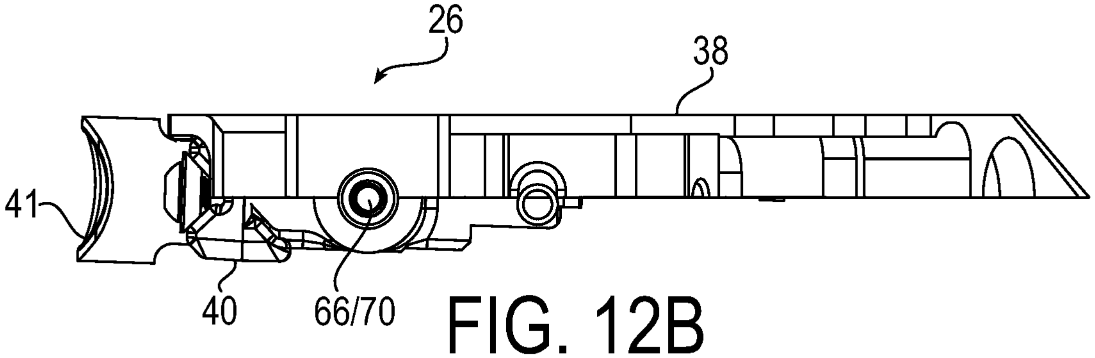
Figure 12C:
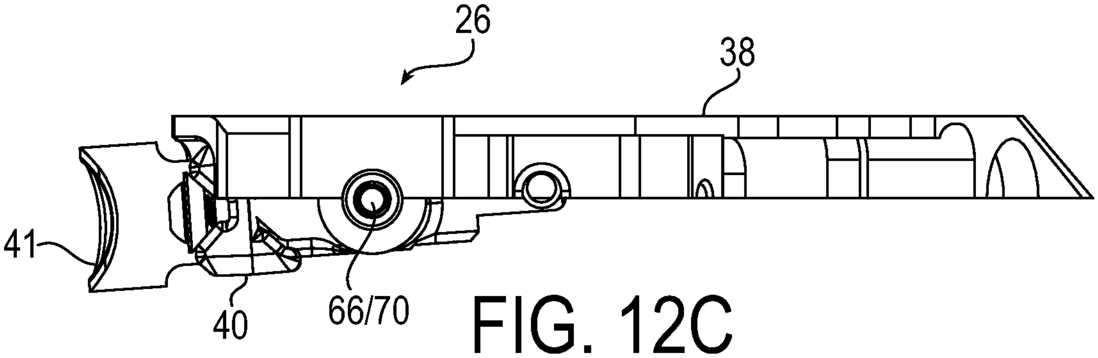

Abduction and adduction are permitted and controlled as follows. FIGS. 12A, 12B, and 12C are drawings depicting top cross-sectional views of the exemplary main insert assembly of FIGS. 9-11, showing different positional states corresponding to different degrees of abduction and adduction of the inner insert 40 relative to the hip insert 38. FIG. 12A shows the main insert assembly 26 in a center or neutral position, i.e., no abduction or adduction of the inner insert 40 relative to the hip insert 38. In such center or neutral position, the inner insert 40 is essentially longitudinally aligned with the hip insert 38 such that the flange extends along a longitudinal axis of the main insert 38. In the position of FIG. 12A, therefore, the connector 41 (and thus any attached thigh component) extends at essentially a zero-angle relative to the hip insert 38 and thus is essentially parallel to a centerline axis of the hip body 24 (thus also to a body centerline of the user).

As referenced above, the inner insert 40 can rotate about the pins 66 and 70 to permit abduction and adduction of the inner insert relative to the hip insert. Comparing FIG. 12A to FIG. 12B, FIG. 12B shows the main insert assembly 26 in an abduction position. In such position, the inner insert 40 is rotated at an abduction angle (toward the hip body centerline or body centerline of the user) relative to the longitudinal axis of the hip insert 38. Now comparing FIG. 12A to FIG. 12C, FIG. 12C shows the main insert assembly 26 in an adduction position. In such position, the inner insert 40 is rotated at an adduction angle (away from the hip body centerline or body centerline of the user) relative to the longitudinal axis of the hip insert 38.

A desired degree of abduction and adduction can vary depending upon characteristics of a user. For example, different body sizes and/or body shapes of users can be best fit with different degrees of abduction and adduction. Another factor can be user capability, as users with a greater degree of residual functionality can benefit from a greater range of allowed abduction and adduction. Related to a degree of abduction and adduction is the level of resistance to abduction and adduction in the hip insert assembly. A higher level of resistance generally would be associated with a lower permitted degree of abduction and adduction, and vice versa (a lower level of resistance permits a greater degree of abduction and adduction). In addition, depending on the user, it may not be desirable for a default or initial angle of rotation of the inner insert to be at the center or neutral positon of FIG. 12A.

Rather, an initial state with a preset angle of abduction or adduction may be desirable depending upon user characteristics. Accordingly, the configuration of the elastomeric bushings 76 and 78 can be varied to preset an initial angle of abduction or adduction (which can be but need not be the zero-angle neutral position), and to permit a different resistance level to control the permitted degree of abduction and adduction from the preset initial angle.

As is apparent from FIGS. 9-12, in both the abduction and adduction positions, respective and opposing shaped ridges 80 and 82 of the elastomeric bushings 76 and 78 are compressed. Accordingly, the shape and the compressibility of the elastomeric bushings 76 and 78 can be varied for different users. In particular, the shape of the ridges 80 and 82 can be configured to determine a desired preset angle for the inner insert 40 (and thus any connected thigh component) relative to the longitudinal axis of the hip insert 38. In addition, a specific durometer of urethane may be selected to provide for a suitable hardness of the elastomeric bushings 76 and 78. The hardness of the durometer of urethane for the elastomeric bushings 76 and 78 is determinative of the resistance to abduction and adduction, and therefore sets the permissible degree of abduction and adduction of the inner insert 40 relative to the longitudinal axis of the hip insert 38 and from the preset initial angle.

Accordingly, the elastomeric bushings are selectable from among a plurality of levels of resistance to compression, and a degree of abduction and adduction relative to an initial angle of rotation of the inner insert is dependent upon the selected level of resistance to compression. In exemplary embodiments where the elastomeric bushings are made of a durometer of urethane, and the elastomeric bushings are selectable from among a plurality of durometers of urethane and the selected durometer of urethane sets the level of resistance to compression. The elastomeric bushings also are selectable from among a plurality of shapes, and the shape the elastomeric bushings presets the initial angle of rotation of inner insert. The elastomeric bushings may be shaped to set the initial angle of rotation to be a neutral position in which there is zero abduction and adduction of the inner insert relative to the hip insert. Alternatively, the elastomeric bushings may be shaped to set the initial angle of rotation to be an initial position in which there is either non-zero abduction or non-zero adduction of the inner insert relative to the hip insert.

Because of the expansive variation of abduction and adduction parameters across the user population, the elastomeric bushings 76 and 78 are easily attached and removed with the fasteners 86 and 88. The ease of attachment and removal of the elastomeric bushings 76 and 78 permits a straight-forward trial-and-error process of testing different elastomeric bushing configurations to find a configuration most suitable for a particular user. In addition, user body type and capability can change over time, and therefore the elastomeric bushings can be readily replaced as needed to accommodate any changes to user characteristics. In this manner, an enhanced system for permitting an optimal degree of abduction and adduction for any given user is achieved in an easy and cost effective manner, as the main components are the same for various users with only the selection of the elastomeric bushings being different for optimal performance.

Figure 13:
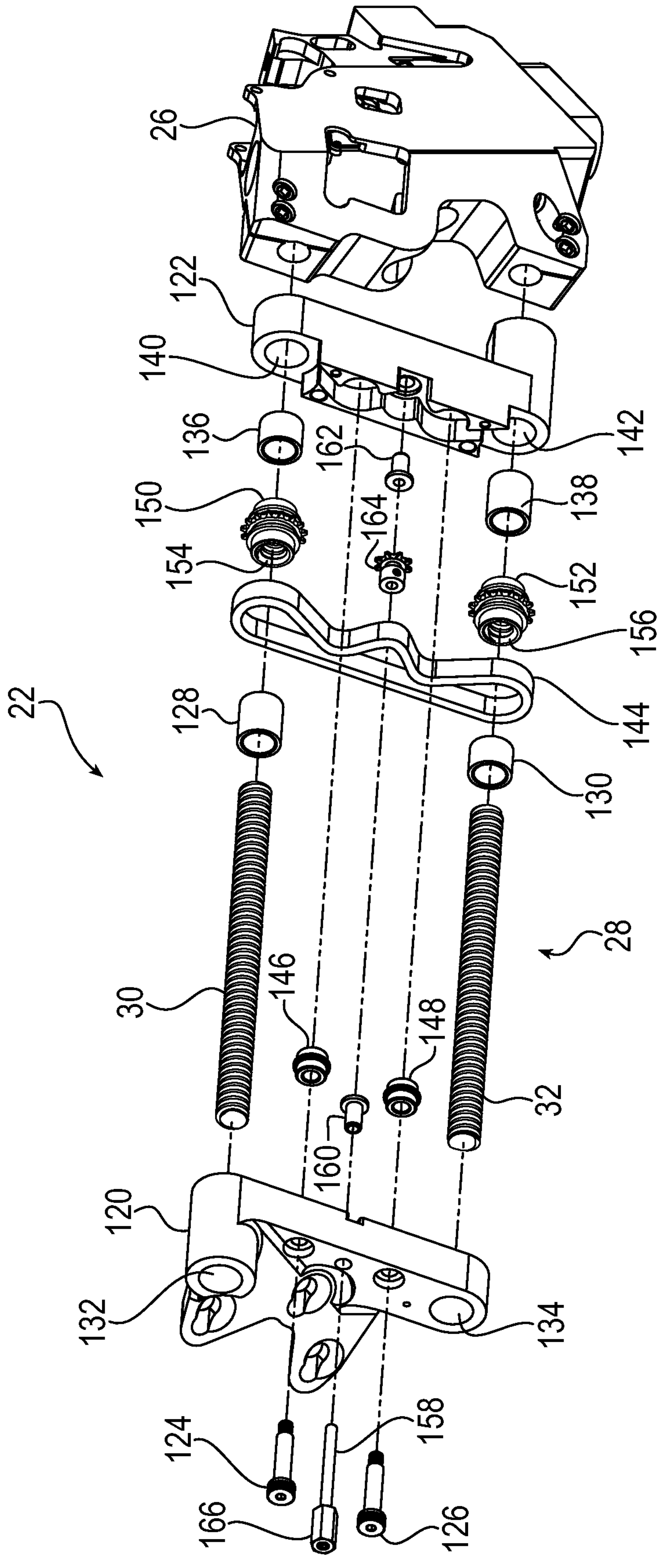
FIG. 13 is a drawing depicting an exploded and isometric view of an exemplary hip insert assembly for use in the hip component of FIGS. 7-8, in accordance with embodiments of the present invention.

Another aspect of the invention is an adjustable hip component that has an enhanced adjustment mechanism for adjusting the size of the hip component, including simultaneous adjustment of a width and depth of the hip component. FIG. 13 is a drawing depicting an exploded and isometric view of the exemplary hip insert assembly 22 for use in the hip component 20 of FIGS. 7-8 in accordance with embodiments of the present invention. FIG. 13 in particular illustrates the features for simultaneously adjusting the width and depth of the hip component.

Generally, in exemplary embodiments an adjustable hip component for a legged mobility device may include a hip body, and a hip insert assembly attached to the hip body for adjusting a size of the hip component. The hip insert assembly may include a carrier assembly mounted to the hip body, a main insert assembly spaced apart from the carrier assembly, and one or more adjustment screws that are connected at a first end to the carrier assembly, and that are connected at a second end opposite from the first end to the main insert assembly. The carrier assembly includes an adjustment mechanism to effect translational movement of the adjustment screws to move the main insert assembly either closer to or farther from the carrier assembly to adjust the size of the hip component.

Referring to FIG. 13 in combination with FIGS. 7-8, the hip insert assembly 22 includes the main insert assembly 26 which has been described in detail above and is depicted in FIG. 13 in its assembled state. As described above with respect to FIGS. 7 and 8, the main insert assembly 26 is connected to the carrier assembly 28 via the one or more (two specifically in this embodiment) adjustment screws 30 and 32. The adjustment screws are connected at a first end to the carrier assembly 28 and at a second end opposite from the first end to the main insert assembly 26. In the depiction in FIG. 13, the carrier assembly 28 is shown in an exploded view to better depict the hip adjustment features.

The carrier assembly 28 may include a first carrier component 120 and a second carrier component 122. The first carrier component is for mounting the carrier assembly to the hip body 24 as shown in FIGS. 7 and 8, with the first carrier component in particular being located against the hip body in the assembled position. The second carrier component 122 is fixed to the first carrier component 120, such as by using a pair of shoulder screws 124 and 126. First sleeve bearings 128 and 130 are housed in cooperating bores 132 and 134 of the first carrier component 120. Similarly, second sleeve bearings 136 and 138 are housed in cooperating bores 140 and 142 of the second carrier component 122. The plurality of sleeve bearings may be cylindrical sleeve bearings and provide a riding surface for rotation of the adjustment screws 30 and 32.

When assembled, the first carrier component 120 and the second carrier component 122 define a housing that houses an adjustment mechanism. As further detailed below, the adjustment mechanism includes a moveable adjustment element, and movement of the adjustment element drives the translational movement of the one or more adjustment screws. The carrier assembly further may include a drive shaft that extends through the first carrier component and into the second carrier component, the drive shaft being rotatable to move the adjustment element to drive the translational movement of the one or more adjustment screws to adjust the size of the hip component.

In exemplary embodiments, the adjustment mechanism may include a rotatable adjustment chain 144 as the moveable adjustment element. Two nuts 146 and 148 are provided for tightening the shoulder screws 124 and 126. The nuts further act as idle wheels for tensioning the adjustment chain 144. The adjustment mechanism includes one or more toothed sprockets corresponding to the one or more adjustment screws (e.g., in the depicted embodiment of two adjustment screws 30 and 30, there are two sprockets 150 and 152), the sprockets having internal threads that interface with corresponding external threading of the one or more adjustment screws. The adjustment chain 144 is looped around the pair of toothed sprockets 150 and 152 such that rotation of the adjustment chain may be imparted to the sprockets, and the sprockets respectively further may include internal threads 154 and 156. The sprockets 150 and 152 respectively receive the adjustment screws 30 and 32 such that the internal threads 154 and 156 can interface with external threading on the adjustment screws 30 and 32 to cause the translational movement of the adjustment screws as further explained below.

The carrier assembly 28 further may include a drive shaft 158 that extends through the first carrier component 120 and into the second carrier component 122. Generally, the drive shaft 158 is rotatable to move the adjustment element (adjustment chain) to drive the translational movement of the adjustment screws to adjust the size of the hip component. Two drive bushings 160 and 162 may be provided to provide riding surfaces for rotation of the drive shaft. The adjustment mechanism further may include a toothed drive sprocket 164 that is attached to the drive shaft 158 such that rotation of the drive shaft is imparted to drive rotation of the drive sprocket 164. The adjustment chain 144 additionally may be looped around the teeth of the drive sprocket 164 such that rotation of the drive sprocket by the drive shaft is imparted to the adjustment chain. The drive shaft 158 may include a shaped head 166 that is configured to cooperate with a correspondingly shaped external tool (not shown) to drive rotation of the drive shaft. In the example of FIG. 13, the shaped head 166 is hexagonal, although any suitable shape may be employed.

Adjustment of the hip component size may be performed as follows. A user may employ an external tool (not shown) to rotate the drive shaft 158. The external tool may be an electric screwdriver or like hand or powered tool suitable for cooperating with the head 166 to drive rotation of the drive shaft. The rotation of the drive shaft thus drives rotation of the drive sprocket 164 which further drives rotation of the adjustment chain 144, and the rotation in turn is imparted by the adjustment chain 144 to the toothed sprockets 150 and 152. Because they are linked by the adjustment chain, the rotation of the sprockets 150 and 152 will be in the same direction. As the sprockets 150 and 152 rotate, the internal threads 154 and 156 interface with the external threading on the adjustment screws 30 and 32 to cause resultant translational movement of the adjustment screws 30 and 32. More particularly, rotation of the sprockets in a first direction (e.g., clockwise) will cause a translational movement of the adjustment screws to move the main insert assembly 26 closer to the second carrier component 122 of the carrier assembly 28. Conversely, rotation of the sprockets in a second direction opposite from the first direction (e.g., counterclockwise) will cause an opposite translational movement of the adjustment screws to move the main insert assembly 26 farther from the second carrier component 122 of the carrier assembly 28.

In this manner, adjustment of the hip component size is achieved by moving the main insert assembly either closer to or farther from the carrier assembly. The movement may be effected using a common, user friendly external tool such as an electric screwdriver or the like. Accordingly, users with physical impairments typical of exoskeleton device users still can adjust the hip component size without needing caregiver assistance, which renders the entire exoskeleton device easier to use for individual users. The adjustment mechanism also adds little to the overall weight of the exoskeleton device, which is significant for users with physical impairments. In the exemplary embodiments described above, the adjustment may be performed using the external tool without the use of an internal motor and related electronics. This also reduces cost, weight, and complexity of the device.

In an alternative embodiment, an internal motor with electronic control may be employed to drive the drive shaft to provide the desired adjustments. An electronic system can be heavier and more expensive, but may be suitable for users with severe impairment for which external tool use could be prohibitive. The use of an electronic motorized system can also afford automated control features. For example, an electronic motorized adjustment system may operate in combination with a control system of an exoskeleton device to provide automatic adjustment to an optimum fit. In exemplary embodiments, user-specific adjustment settings can be stored as part of the device settings, so the automatic adjustment can occur upon entry of a user login for the device. Relatedly, the automated adjustment to optimum fit can occur using a "one-push" fitting, whereby a user whose adjustment settings are entered into the system can achieve the optimum adjustment by pressing a single dedicated input button. An electronic motorized adjustment system further can perform skin pressure relief techniques to avoid forming pressure ulcers by automatically and frequently varying the fit slightly during a user session. Further potential automatic adjustments may include adjustments to ensure the exoskeleton device bears its own weight, and to minimize joint component power requirements. An electronic motorized adjustment system also may have an automatic retract feature, by which the adjustment mechanism returns the exoskeleton device to a default state after use. The default state may be of minimal size for better storage of the exoskeleton device As seen in FIGS. 7 and 8, the adjustment screws 30 and 32 are oriented at an obtuse angle relative to a lateral axis of the hip body 24. With such orientation, movement of the main insert assembly via the adjustment screws operates simultaneously to adjust both the width and depth of the hip component. Typically, user size and body shape will dictate in combination the desired hip component width and depth. Accordingly, the simultaneous adjustment of hip component width and depth provides a significant efficiency of the adjustment mechanism of the present invention.

An adjustable leg component for a legged mobility or exoskeleton device will now be described. Generally, in exemplary embodiments an adjustable leg component for a legged mobility device may include a central carrier, and first and second housings that are located on opposite sides of the central carrier and mechanically connected to the central carrier. The leg component further may include an adjustment mechanism configured to effect movement of the first housing either closer to or farther from the second housing to adjust a length of the leg component.

Figure 14:
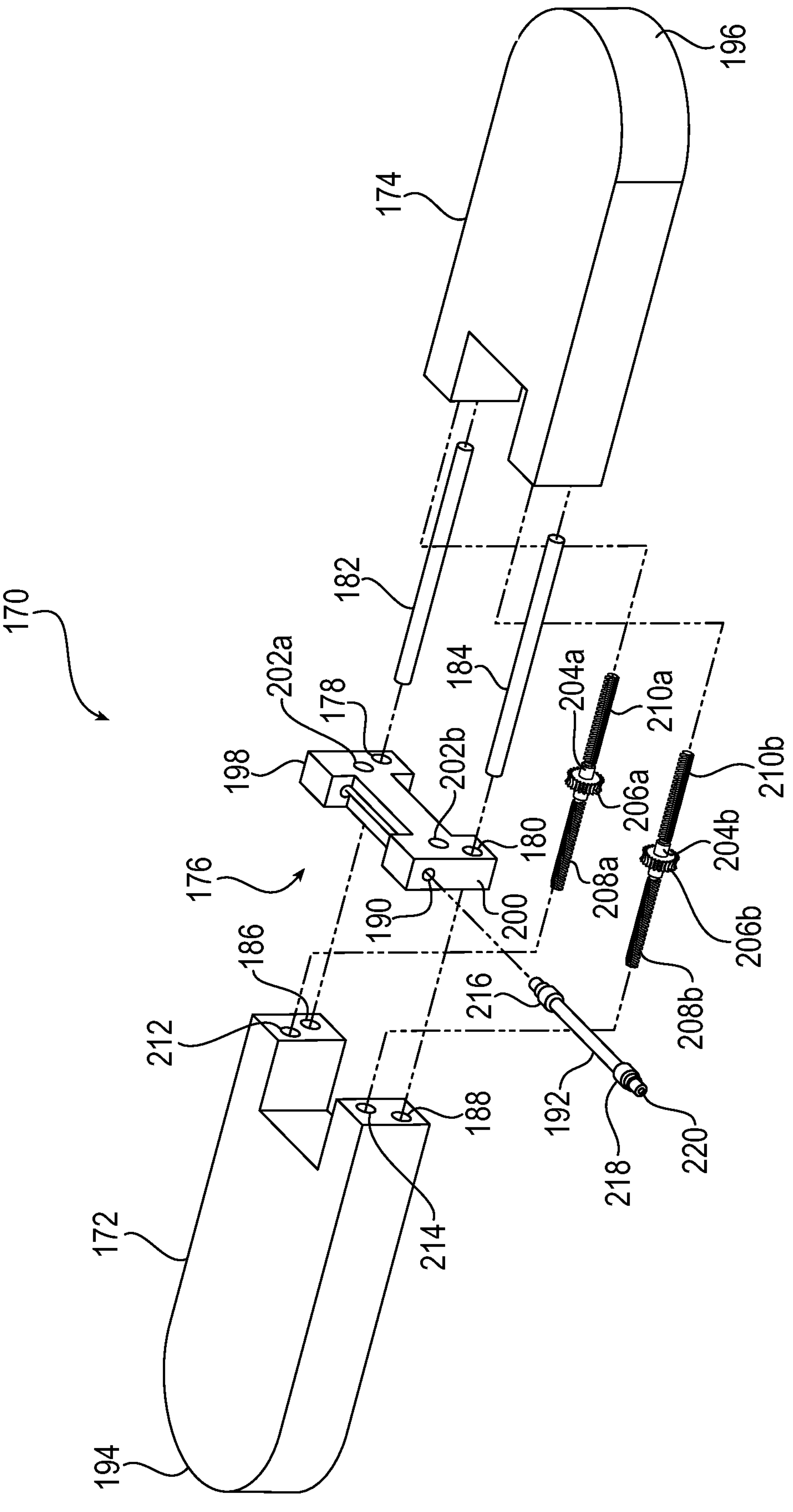
FIG. 14 is a drawing depicting an exploded and isometric view of an exemplary leg component of a legged mobility device, in accordance with embodiments of the present invention.

FIG. 14 is a drawing depicting an exploded and isometric view of an exemplary leg component 170 of a legged mobility device in accordance with embodiments of the present invention. The leg component 170 may include a first housing 172 and a second housing 174 that is positioned oppositely relative to the first housing. The leg component may include an adjustment mechanism that adjusts a length of the leg component 170 by adjusting the positioning of the first housing 172 relative to the second housing 174. The leg component of FIG. 14 may be employed as upper and/or lower leg components of the exoskeleton device depicted in FIGS. 1-6. In an exemplary embodiment, the leg component 170 may be a thigh component for a powered legged mobility or exoskeleton device. In such an embodiment, the housings may house the requisite drive components for driving the knee and hip joint components of the device.

The leg component 170 may include a central carrier 176 for housing portions of the adjustment mechanism. The first housing and the second housing may be mechanically connected to the central carrier using one or more rails. The one or more rails each extends through the central carrier and are anchored at a first end in the first housing and anchored at a second end opposite from the first end in the second housing. As seen in the example of FIG. 14, the central carrier 176 may define rail bores 178 and 180 through which rails 182 and 184 extend. The rails 182 and 184 may be anchored in anchor bores 186 and 188 defined by the first housing 172. Two like anchor bores would be defined by the second housing 174, although such bores are not visible in the view of FIG. 13. The rails 182 and 184 are fixed shafts that provide for reinforcement of the leg component 170, while providing smooth movement of the first housing relative to the second housing for length adjustment of the leg component.

As further detailed below, an adjustment mechanism for adjusting a length of the leg component may include a drive shaft that extends through the central carrier; and one or more driven shafts that extend through the central carrier and are connected at a first end to the first housing and connected at a second end opposite from the first end to the second housing. The drive shaft rotates to drive the one or more driven shafts to effect translational movement of the one or more driven shafts to move the first housing closer to or farther from the second housing to adjust the length of the leg component.

Referring to FIG. 14, the central carrier 176 further may define a drive shaft bore 190 that is configured to receive a drive shaft 192. For purposes of explanation, a longitudinal direction is defined as running along an axis from an external end 194 of the first housing 172 to an external end 196 of the second housing 174. A lateral direction is perpendicular to the longitudinal direction in a plane of the leg component 170. As defined, the rails 182 and 184 extend from the first housing to the second housing in the longitudinal direction. In addition, the drive shaft 192 extends through the central carrier 176 in the lateral direction perpendicular to the longitudinal direction from a first lateral end 198 toward a second lateral end 200 of the central carrier 176.

The one or more driven shafts may extend through the central carrier in the longitudinal direction from the first housing to the second housing. Referring to FIG. 14, the central carrier 176 further may define a first driven shaft bore 202*a* that is configured to receive a first driven shaft 204*a*. The first driven shaft 204*a* may include a first worm gear 206*a* that in an assembled state is located particularly within the first driven shaft bore 202*a*. On opposite sides of the first worm gear 206*a*, the first driven shaft 204*a* may include a first screw thread 208*a* and a second screw 210*a* threaded oppositely relative to first screw thread 208*a*. For example, for appropriate adjusting the first screw thread 208*a* may be a left handed screw thread and the second screw thread 210*a* may be a right handed screw thread. To provide a dual adjustment mechanism, an identical second comparable set of features may be provided. The central carrier 176 thus further may define a second driven shaft bore 202*b* that is configured to receive a second driven shaft 204*b*. The second driven shaft 204*b* may include a second worm gear 206*b* that in the assembled state is located particularly within the second driven shaft bore 202*b*. On opposite sides of the second worm gear 206*b*, the second driven shaft 204*b* may include another first screw thread 208*b* and another second screw 210*b* threaded oppositely relative to third screw thread 208*b*. For example, for appropriate adjusting the another first screw thread 208*b* may be a left handed screw thread and the another second screw thread 210*b* may be a right handed screw thread.

The driven shafts 204*a* and 204*b* may be anchored in adjustment bores 212 and 214 defined by the first housing 172. Two like adjustment bores would be defined by the second housing 174, although such bores are not visible in the view of FIG. 13. The adjustment bores may include internal threads that respectively can interface with the external threads on the driven shafts.

As referenced above, each of the one or more driven shafts has a worm gear, and the drive shaft may have one or more worms corresponding to each of the worm gears, and rotation of the drive shaft drives the driven shafts by interaction of the worms and worm gears. In the example of FIG. 14, in which there are two driven shafts each with a corresponding worm gear, the drive shaft 192 may include a first worm 216 that is configured to mesh with the first worm gear 206*a*, and a second worm 218 that is configured to mesh with the second worm gear 206*b*. The drive shaft 192 further may include an end socket 220 that is configured for cooperating with a correspondingly shaped external tool (not shown). Any suitable shape of end socket may be employed.

Adjustment of the leg component length may be performed as follows. A user may employ an external tool (not shown) to rotate the drive shaft 192. The external tool may be an electric screwdriver or like hand or powered tool suitable for cooperating with the end socket 190 to drive rotation of the drive shaft 192. The rotation of the drive shaft 192 thus drives rotation of the worms 216 and 218, which further drives rotation of the worm gears 206*a* and 206*b*. This rotation in turn is imparted to the driven shafts 204*a* and 204*b*. Because the driven shafts are configured essentially identically, the rotation of the driven shafts will be in the same direction. As the driven shafts 204*a* and 204*b* rotate, the threads 208*a*/208*b* and 210*a*/210*b* interface with the internal threading in the adjustment bores of the first and second housings 172 and 174 to cause resultant translational movement of the driven shafts 204*a* and 204*b* in the longitudinal direction. Again because the driven shafts, and the directions of the screw threads in particular, are configured essentially identically, the translational movement of the driven shafts will be the same. More particularly, rotation of the drive shaft in a first direction (e.g., clockwise) will cause a translational movement of the driven shafts to move the first housing 172 closer to the second housing 174. Conversely, rotation of the drive shaft in a second direction opposite from the first direction (e.g., counterclockwise) will cause an opposite translational movement of the driven shafts to move the first housing 172 farther from the second housing 174.

In this manner, adjustment of the leg component length is achieved by moving the first housing either closer to or farther from the second housing. Similarly as with the hip component adjustment mechanism, the movement for adjusting the leg component may be effected using a common, user friendly external tool such as an electric screwdriver or the like. Accordingly, users with physical impairments typical of exoskeleton device users still can adjust the leg component length without needing caregiver assistance, which renders the entire exoskeleton device easier to use for individual users. The leg component adjustment mechanism also adds little to the overall weight of the exoskeleton device, which is significant for users with physical impairments. In the exemplary embodiments described above, the adjustment may be performed using the external tool without the use of an internal motor and related electronics. This also reduces cost, weight, and complexity of the device. In an alternative embodiment, an internal motor with electronic control may be employed to drive the drive shaft to provide the desired adjustments. An electronic system can be heavier and more expensive, but may be more suitable for users with severe impairment for which external tool use could be prohibitive, and further may include the automated features described above with respect to the electronic motorized hip adjustment system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An adjustable leg component for a legged mobility device, the leg component comprising:
- a central carrier; and
- first and second housings that are located on opposite sides of the central carrier and mechanically connected to the central carrier; and
- an adjustment mechanism configured to implement movement of the first housing either closer to or farther from the second housing to adjust a length of the leg component;
- the adjustment mechanism includes a drive shaft that extends through the central carrier; and a plurality of driven shafts that extend through the central carrier and are connected at a first end to the first housing and connected at a second end opposite from the first end to the second housing; and
- the drive shaft rotates to drive the plurality of driven shafts to implement translational movement of the plurality of driven shafts to move the first housing closer to or farther from the second housing to adjust the length of the leg component;
- wherein the plurality of driven shafts extend through the central carrier in a longitudinal direction along a longitudinal axis of the leg component, and the drive shaft extends through the central carrier in a lateral direction that is perpendicular to the longitudinal direction, and
- wherein each of the plurality of driven shafts has a worm gear, and the drive shaft has a plurality of worms corresponding to each of the worm gears, and rotation of the drive shaft drives the plurality of driven shafts by interaction of the worms and worm gears.

2. The leg component of claim 1, wherein:
- each of the plurality of driven shafts has a first screw thread and a second screw thread on opposite sides of the worm gear; and
- the first and second housings define bores for receiving the plurality of driven shafts, and the bores include internal threading for interfacing with the first and second screw threads of the plurality of driven shafts.

3. The leg component of claim 1, wherein the drive shaft has an end socket that is configured to cooperate with an external tool to drive rotation of the drive shaft.

4. The leg component of claim 1, wherein the leg component includes an internal motor that is controlled to drive rotation of the drive shaft.

5. The leg component of claim 1, wherein the plurality of driven shafts consists of two driven shafts that have an identical configuration.

6. The leg component of claim 1, wherein:
the first and second housings are mechanically connected to the central carrier using a plurality of rails; and
the plurality of rails each extend through the central carrier and are anchored at a first end in the first housing and anchored at a second end opposite from the first end in the second housing.

7. A legged mobility device comprising:
a hip component; and
at least one leg component according to claim 1 that is attached to the hip component.

8. An adjustable leg component for a legged mobility device, the leg component comprising:
a central carrier; and
first and second housings that are located on opposite sides of the central carrier and mechanically connected to the central carrier; and
an adjustment mechanism configured to implement movement of the first housing either closer to or farther from the second housing to adjust a length of the leg component;
the adjustment mechanism includes a drive shaft that extends through the central carrier; and a plurality of driven shafts that extend through the central carrier and are connected at a first end to the first housing and connected at a second end opposite from the first end to the second housing; and
the drive shaft rotates to drive the plurality of driven shafts to implement translational movement of the plurality of driven shafts to move the first housing closer to or farther from the second housing to adjust the length of the leg component;
wherein the plurality of driven shafts extend through the central carrier in a longitudinal direction along a longitudinal axis of the leg component, and the drive shaft extends through the central carrier in a lateral direction that is perpendicular to the longitudinal direction; and wherein the drive shaft has an end socket that is configured to cooperate with an external tool to drive rotation of the drive shaft.

9. A legged mobility device comprising:
a hip component; and
at least one leg component according to claim 8 that is attached to the hip component.

10. An adjustable leg component for a legged mobility device, the leg component comprising:
a central carrier; and
first and second housings that are located on opposite sides of the central carrier and mechanically connected to the central carrier; and
an adjustment mechanism configured to implement movement of the first housing either closer to or farther from the second housing to adjust a length of the leg component;
the adjustment mechanism includes a drive shaft that extends through the central carrier; and a plurality of driven shafts that extend through the central carrier and are connected at a first end to the first housing and connected at a second end opposite from the first end to the second housing; and
the drive shaft rotates to drive the plurality of driven shafts to implement translational movement of the plurality of driven shafts to move the first housing closer to or farther from the second housing to adjust the length of the leg component;
wherein the plurality of driven shafts extend through the central carrier in a longitudinal direction along a longitudinal axis of the leg component, and the drive shaft extends through the central carrier in a lateral direction that is perpendicular to the longitudinal direction;
the first and second housings are mechanically connected to the central carrier using a plurality of rails; and
the plurality of rails each extend through the central carrier and are anchored at a first end in the first housing and anchored at a second end opposite from the first end in the second housing.

11. A legged mobility device comprising:
a hip component; and
at least one leg component according to claim 10 that is attached to the hip component.

* * * * *